United States Patent [19]
Savard et al.

[11] Patent Number: 6,098,664
[45] Date of Patent: Aug. 8, 2000

[54] PIPELINE PLUG

[75] Inventors: Donald Savard; Jaromir Friedrich, both of Edmonton, Canada

[73] Assignee: PA - Plug Inc., Edmonton, Canada

[21] Appl. No.: 09/255,389

[22] Filed: Feb. 22, 1999

[51] Int. Cl.⁷ ................................................... F16L 55/10
[52] U.S. Cl. ............................................. 138/89; 138/90
[58] Field of Search ........................................ 138/89, 90

[56]  References Cited

U.S. PATENT DOCUMENTS

| | | | |
|---|---|---|---|
| 4,262,702 | 4/1981 | Streich | 138/89 |
| 4,292,004 | 9/1981 | Knox | 138/89 X |
| 4,462,430 | 7/1984 | Anthony et al. | 138/89 |
| 4,494,584 | 1/1985 | Rognoni | 138/89 X |
| 4,498,811 | 2/1985 | Fern et al. | 138/89 X |
| 4,687,026 | 8/1987 | Westman | 138/89 |
| 4,875,615 | 10/1989 | Savard | 138/89 X |

*Primary Examiner*—Patrick Brinson
*Attorney, Agent, or Firm*—Hovey, Williams, Timmons & Collins

[57] ABSTRACT

A pipeline plug is disclosed having an elastomeric disc-shaped sealing element provided with deforming means whereby the outside diameter of the elastomeric element is deformed to reduce its outside diameter to facilitate its insertion onto a pipeline. In another embodiment described, the plugging element and the deforming means are so arranged that when the deforming means act on the element, the latter is expanded into a sealing arrangement. The plugging elements are shown at one end of a spool assembly with resilient guide means to permit movement of the plug through a pipeline, but the plugging elements and their deforming means can also be used separately.

12 Claims, 2 Drawing Sheets

PIPELINE PLUG

FIELD OF INVENTION

The present invention relates to a plug for temporarily sealing (plugging) open end of a pipe or vessel to prevent vapors, fumes or the like from the pipeline to migrate into a work area.

BACKGROUND OF THE INVENTION

Pipeline pigs are known to provide sealing of a portion of a pipeline when repairs, inspection or the like tasks are to be carried out. The known pigs are designed for use in an environment where relatively high pressures are involved. Therefore, they are of a robust, complex and thus expensive structure for use such as preventing vapors or the like to escape from a pipeline into a working area, where relatively low pressures are normally encountered.

SUMMARY OF THE INVENTION

It is an object of the present invention to provide a structurally simple plug particularly suitable for use at an end of a pipeline or vessel to shield a working area from vapours, fumes or the like present in a pipeline.

In general terms, the invention provides a pipeline plug for temporarily plugging an end of a pipeline, vessel or the like, comprising an elastomeric, generally disc-shaped sealing element having a predetermined outside diameter at an outer periphery thereof. The plug further comprises actuation means for exerting pressure upon said element to change said predetermined outside diameter thereof.

BRIEF DESCRIPTION OF THE DRAWINGS

The invention will be briefly described with reference to the accompanying drawings.

DETAILED DESCRIPTION

Figure 1:
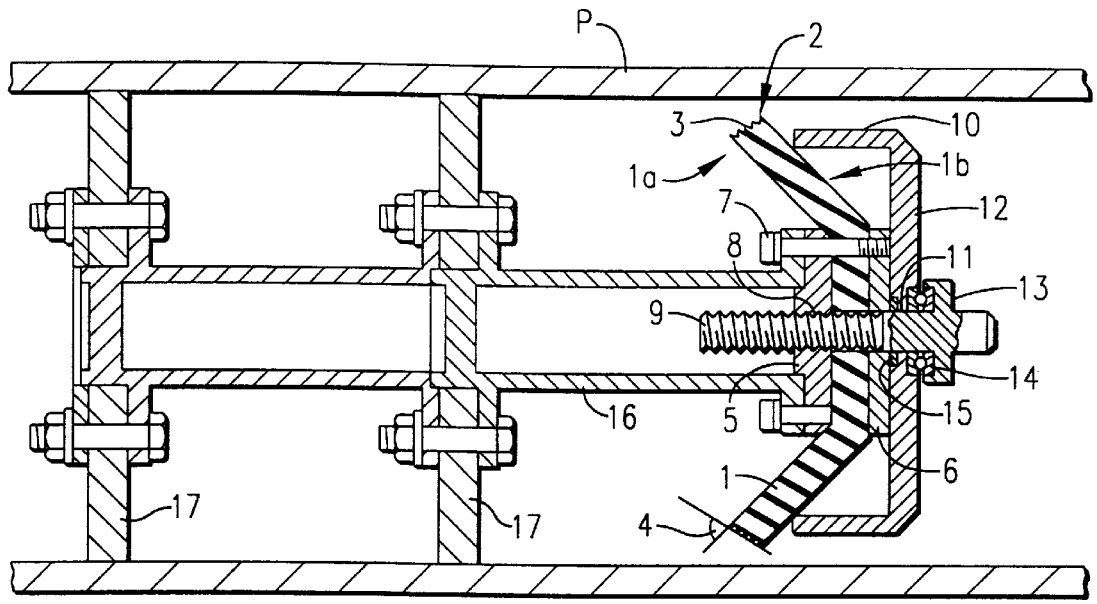
FIG. 1 is a simplified diagrammatic cross-sectional view of a device according to a first embodiment of the present invention showing the sealing element in a contracted state.

The preferred embodiment of the plug of the present invention is shown in FIG. 1. It can be inserted into an open end of a pipeline or vessel.

Turning now to FIG. 1, the plug of the invention consist of a frustoconical, cup-shaped elastomeric sealing element 1. The element 1 has a central portion and a generally frustoconical segment diverging from the central portion presenting obliquely oriented major wall surfaces and a margin at the outboard ends of the wall surfaces, thereby presenting a concave axial face 1a and a convex axial face 1b. The concave face 1a is turned toward the pressurized part of the pipe P, the convex face 1b to the non-pressurized part of the pipe 1. The outermost part 2 of the element 1 defines the outside diameter of the element 1. It has the form of a cone and is furnished with radial ribs 3. The central portion presents a smaller inner diameter portion.

Figure 2:
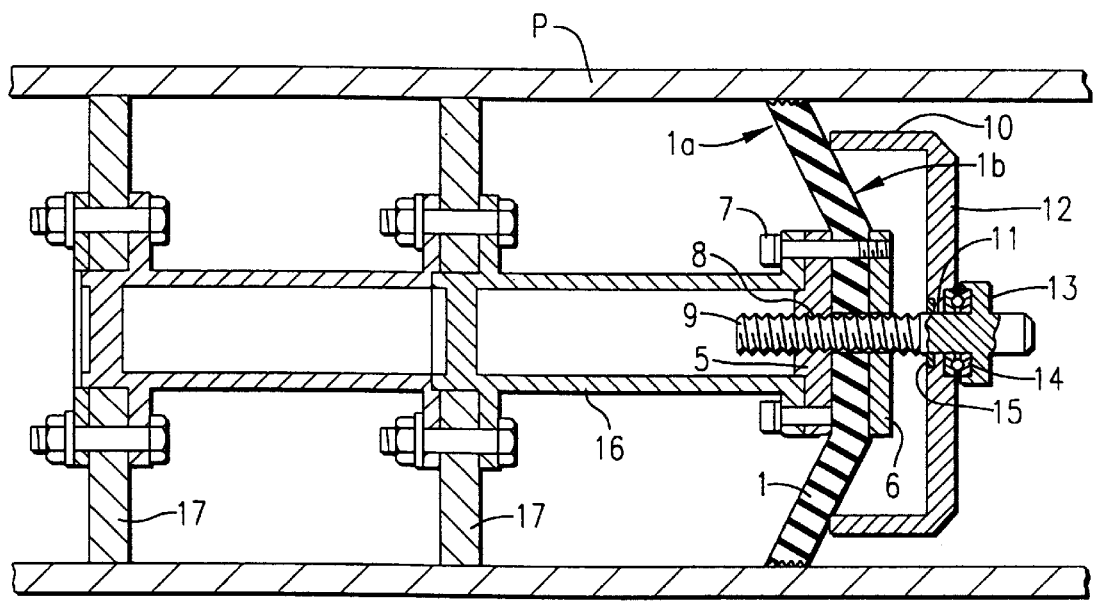
FIG. 2 is a view similar to that of FIG. 1 and showing the sealing element in an expanded, sealing state.

The surface angle 4 of the outermost part 2 is so oriented that upon contact of the seal 1 with the pipe P the outermost part is generally aligned with the interior of the pipeline to allow the elastomeric sealing element 1 to come in full contact with the inside wall of the pipe P. The ribs 3 enhance the sealing capability of the element as each rib acts as independent seal. The sealing element is disposed between two flanges 5 & 6 and fastened by bolts 7. The rear flange has thread 8 tapped at the centre to receive a jack bolt 9 used to move a deflector ring 10 forth or back forcing the sealing element 1 into a contracted state of FIG. 1, or releasing it thus permitting it to expand into contact with the pipe 1 as shown in FIG. 2. The jack bolt 9 is inserted through a clearance hole 11 at centre of the radial plate 1 2 of the deflector ring 10.

The friction between the bolt head 13 and ring plate 12 is reduced by a thrust ball bearing 14. The bolt 9 is axially secured to the plate 1 2 by a snap ring 15.

The unit just described can be used by itself or in combination with two spools 16 equipped with resilient discs 17 or cups if the apparatus has to be transported through pipeline.

In operation, the plug in the state of FIG. 1 is inserted in a pipeline to prevent leakage of gases or fumes from the pipe 9. In this stage the bolt 9 or other actuation means for exerting pressure on the sealing element 1 is active to axially displace the deflector ring 10 to the left as shown in FIG. 1 to deform the seal 1 into the contracted state.

When the seal is placed at the desired location in the pipe P, the bolt 9 or an equivalent actuation means is caused to move the ring 10 to the right of FIG. 1, to the position of FIG. 2, where the ring 10 no longer exerts axial pressure unto the seal element 1. The seal element expands by its own resiliency bringing the outermost part 2 and thus the ribs 3 into contact with the wall of the pipe P. At this expanded state, the sealing element 1 is active and provides a sealing barrier preventing escape of gases or the like from the pipe P.

Those skilled in the art will readily appreciate that the described arrangement utilizing the bolt 9 and the threaded hole 8 may be substituted by other known mechanisms, for instance, by a hydraulic or pneumatic mechanism selectively exerting or releasing axial pressure at the plate 12.

Figure 3:
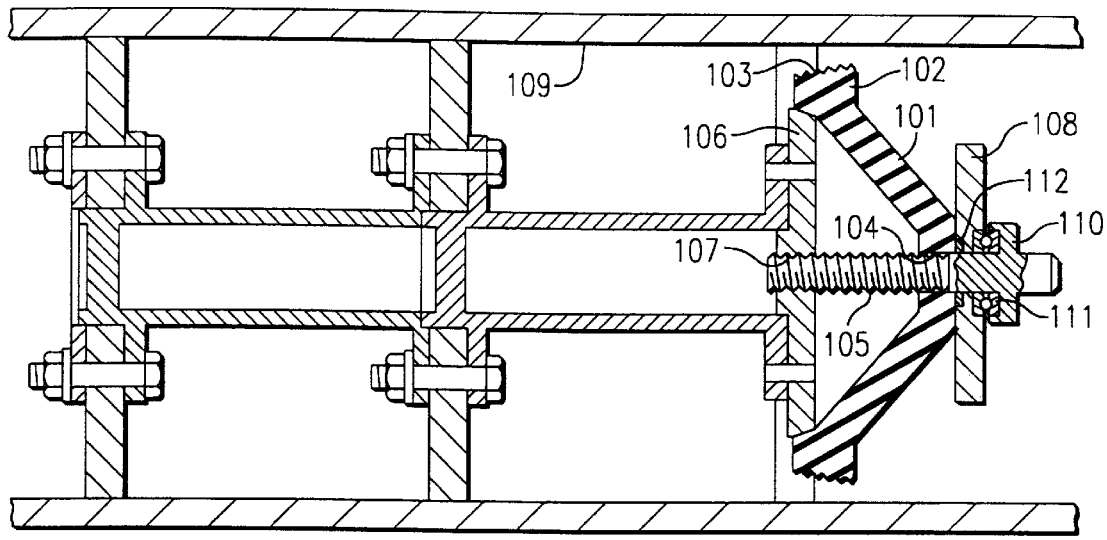
FIG. 3 is a view similar to that of FIG. 1 but showing a second embodiment of the invention, with the sealing element in a contracted state.
Figure 4:
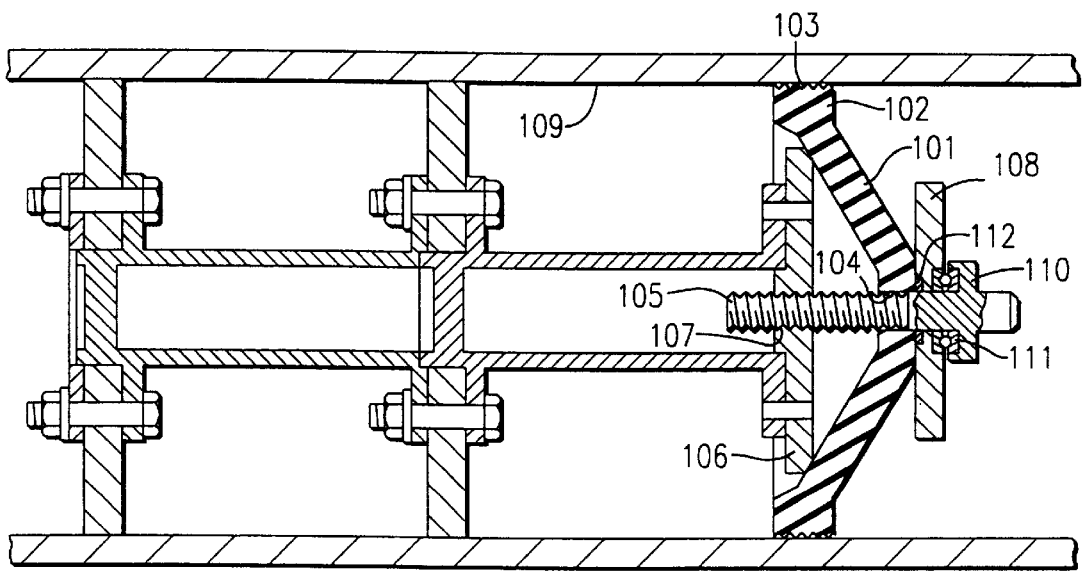
FIG. 4 is a view similar to that of FIG. 3 and showing the sealing element in an expanded, sealing state.

The second embodiment of the plug is shown in FIGS. 3 and 4. As in the first embodiment, it includes a frusto-conical cup-shaped elastomeric sealing element 101 having the general shape of a cone where the outside part 102 of the element is thickened and the outer surface thereof is furnished with radial ribs 103 to enhance effectiveness of the sealing element 101. In a relaxed state, the element 101 assumes the position of FIG. 3 where the seal is disengaged from the pipe wall 109.

The centre of the sealing element 101 has a clearance hole 104 allowing a jack screw 105 to pass through, The inner surface of the element is supported by a deflection disc 106. The deflection disc has threaded hole 107 at the centre for the jack screw 105 which also cooperates with an outer disc 108 to squeeze the sealing element 101 by pushing the deflection disc 106 and the outer disc 108 axially to each other. This action causes the element 101 to expand (FIG. 4) and the ribbed outer surface 103 is forced against pipe wall 109. Friction between the bolt head 110 and the back plate 8 is reduced by a thrust ball bearing 111. The lack screw 105 is axially secured in position relative to the disc 108 by a snap ring 112.

The operation is similar to that of the first embodiment but in the embodiment of FIGS. 3 and 4 the sealing element 101 Is contracted when in relaxed state (FIG. 3) and expanded by application of axial force (FIG. 4).

As in the first embodiment described, the required actuation means for exerting pressure upon the element 101 to activate the sealing element 101 can be created by other known means, mechanical, hydraulic, pneumatic or electric. Therefore, the term "actuation means" as used above or in the accompanying claims is to be interpreted as including not only the particular mechanisms disclosed but also their obvious alternatives.

What is claimed is:

1. A pipeline plug for temporarily plugging an end of a pipeline, vessel or the like to prevent vapors or the like from the pipeline to migrate into a work area, comprising:

(a) an elastomeric, generally cup shaped sealing element having a predetermined outside diameter at an outer periphery thereof for contacting an inner surface of said pipeline;

(b) an actuator for exerting pressure upon said element to change said predetermined outside diameter thereof, the disposition of said element and said actuator being such that when the actuator exerts pressure upon said element, the outside diameter is contracted.

2. An elongated pipeline plug for temporarily plugging a portion of a pipeline to prevent vapors or the like from leaving the pipeline, said plug comprising:

an elongated body presenting a longitudinal axis generally coincident, in use, with the axis of said pipeline;

an elastomeric sealing element operably coupled with said body and presenting a central portion and a generally frustoconical segment diverging from said central portion, said segment having opposed, obliquely oriented major wall surfaces and a margin at the outboard ends of said wall surfaces for sealingly engaging an inner surface of said pipeline; and an actuator for engaging one of said major surfaces in order to deflect said segment, the other of said major surfaces being unrestrained during said segment deflection.

3. The plug of claim 2, said actuator engaging said one major surface at a point thereon closer to said margin than said longitudinal axis.

4. The plug of claim 2, said actuator being shiftable along said longitudinal axis through a jack screw.

5. An elongated pipeline plug having a longitudinal axis generally coincident, in use, with the axis of a pipeline for temporarily plugging a portion of the pipeline to prevent vapors or the like from the pipeline to migrate into a work area, comprising:

(a) an elastomeric sealing element including:

(1) a generally frustoconical cup-shaped body having a predetermined angle as determined at the longitudinal axis, said body including a smaller inner diameter portion and an outside diameter portion, an outer generally frustoconical wall portion, an inner, concave, generally frustoconical wall portion, said frustoconical portions being operable to move relative to said inner diameter portion, the taper of both said frustoconical portions being convergent in the same direction along with said axis, (2) an outer, peripheral sealing portion having a predetermined diameter and extending between outside diameter portions of said outer and inner frustoconical wall portions;

(b) an actuator for exerting pressure upon said element to change said angle arid thus the diameter of said sealing portion.

6. The plug of claim 5, wherein the disposition of said element and said actuator is such that when the actuator exerts pressure upon said element, the apex angle is reduced, whereby the outside diameter of the sealing portion is contracted.

7. The plug of claim 5, wherein the disposition of said element and said actuator is such that when the actuator exerts pressure upon said element, the apex angle is increased, whereby the outside diameter of the sealing portion is expanded.

8. The plug of claim 5, wherein said minor diameter portion of the element is mounted on a spool assembly of a pipeline pig.

9. The plug of claim 5, wherein said outer peripheral sealing portion is provided with a plurality of sealing ribs adapted to sealingly engage the interior of a pipeline when the outer periphery of said element is expanded.

10. The plug of claim 5, wherein said minor diameter portion of the element is fixedly secured to a spool assembly of said plug.

11. The plug of claim 10, wherein the disposition of said element and said actuator is such that when the actuator exerts pressure upon said element, the apex angle is reduced, whereby the outside diameter is contracted.

12. The plug of claim 10, wherein the disposition of said element and said actuator is such that when the actuator exerts pressure upon said element, the apex angle is increased, whereby the outside diameter is expanded.

* * * * *